US006725989B1

(12) United States Patent
Krisher et al.

(10) Patent No.: US 6,725,989 B1
(45) Date of Patent: Apr. 27, 2004

(54) VARIABLY CONTROLLED TORQUE COUPLING DEVICE FOR ON-DEMAND ALL-WHEEL DRIVE DRIVETRAINS

(75) Inventors: James A. Krisher, Fort Wayne, IN (US); John Allen Grogg, LaOtto, IN (US)

(73) Assignee: Torque-Traction Technologies, Inc., Maumee, OH (US)

( * ) Notice: Subject to any disclaimer, the term of this patent is extended or adjusted under 35 U.S.C. 154(b) by 0 days.

(21) Appl. No.: 10/128,554

(22) Filed: Apr. 24, 2002

(51) Int. Cl.[7] .................... B60K 17/348; F16D 25/0638
(52) U.S. Cl. .................. 192/35; 192/85 AA; 192/103 F
(58) Field of Search .............................. 192/35, 85 AA, 192/103 F; 180/249

(56) References Cited

U.S. PATENT DOCUMENTS

| | | | |
|---|---|---|---|
| 4,719,998 A | * | 1/1988 | Hiramatsu et al. .......... 477/175 |
| 4,850,447 A | * | 7/1989 | Hirakushi et al. .......... 180/248 |
| 4,938,306 A | * | 7/1990 | Sumiyoshi et al. ......... 180/233 |
| 5,148,903 A | | 9/1992 | Kobayashi et al. |
| 5,297,994 A | | 3/1994 | Suzuki et al. |
| 5,967,285 A | | 10/1999 | Mohan et al. |
| 5,979,631 A | | 11/1999 | Lundstrom |
| 6,183,387 B1 | | 2/2001 | Yoshioka |
| 6,250,444 B1 | | 6/2001 | Gratzer |
| 6,315,097 B1 | | 11/2001 | Burns |
| 6,318,532 B1 | | 11/2001 | Gassmann |

* cited by examiner

Primary Examiner—Richard M. Lorence
(74) Attorney, Agent, or Firm—Liniak, Berenato & White

(57) ABSTRACT

A hydraulically actuated torque-coupling device is provided for selectively actuating a secondary drive axle of an All-Wheel Drive motor vehicle when wheel slippage occurs with a primary axle. The torque-coupling device comprises a housing, an input shaft and an output shaft both rotatably supported within the housing, a selectively engageable friction clutch assembly for operatively coupling the input shaft to the output shaft, and hydraulic clutch actuator. The hydraulic actuator includes a hydraulic pump located within the housing and adapted to generate a hydraulic pressure to frictionally load the friction clutch assembly, and a variable pressure relief valve assembly fluidly communicating with the hydraulic pump to selectively control the hydraulic pressure generated by the pump. The variable pressure relief valve assembly includes an electro-magnetic actuator for selectively varying a release pressure of the pressure relief valve assembly based on a magnitude of an electric current applied thereto.

28 Claims, 5 Drawing Sheets

VARIABLY CONTROLLED TORQUE COUPLING DEVICE FOR ON-DEMAND ALL-WHEEL DRIVE DRIVETRAINS

BACKGROUND OF THE INVENTION

1. Field of the Invention

The present invention relates to hydraulic coupling assemblies for motor vehicles, and more particularly to a torque-coupling device for an on-demand all-wheel drive (AWD) system having an electronically controlled hydraulic actuator including an electro-magnet actuated variable pressure relief valve for selectively activating a secondary drive axle of the AWD motor vehicle.

2. Description of the Prior Art

Many modern vehicles employ four-wheel drive systems. These systems have been marketed in two forms. Systems generally termed four-wheel drive (4WD) have a transfer case, which is controlled by the operator to select two wheel or four-wheel drive. If the operator selects the four-wheel drive condition, the vehicle drives all four wheels continuously. Some of these systems have employed overrunning clutches at two of the wheels to alleviate some of the disadvantages of 4WD which result from tire pressure differential and cornering to name a few.

All wheel drive (AWD) systems also provide the benefits of a four-wheel drive vehicle and do not require the operator to intentionally select this condition. These systems often employ a viscous clutch in the center differential to transfer torque to the drive wheels that are not sensed as slipping. In tight cornering situations and during towing, these AWD systems present a disadvantage. In cornering situations, noise and vibration can result from the AWD system being engaged. While this is not detrimental to the powertrain during short durations, it can be disconcerting to the operator.

Hydraulic couplings are used in various vehicular drivetrain applications to limit slip and transfer drive torque between a pair of rotary members. In all-wheel drive applications, hydraulic couplings are used to automatically control the drive torque transferred from a driven member to a non-driven member in response to speed differentiation therebetween. In limited slip applications, couplings are used in association with a differential to automatically limit slip and bias the torque distribution between a pair of rotary members.

Such hydraulic couplings conventionally use a frictional clutch between the rotary members. The frictional clutch may be selectively actuated by various hydraulic actuator assemblies, which are constructed of elements disposed inside the differential casing. The hydraulic actuator assemblies internal to the differential case often include displacement pumps disposed inside the differential casing and actuated in response to a relative rotation between the differential case and the output shaft. The displacement pumps are usually in the form of internal gear pumps, such as gerotor pumps adapted to convert rotational work to hydraulic work. In the internal gear pumps, an inner gear having outwardly directed teeth cooperates with an external gear having inwardly directed teeth so that fluid chambers therebetween increase and decrease in volume as the inner and outer gears rotate in a housing.

By connecting the inlet and outlet of the device to the proper location along the sides of the gear set, the variable displacement chambers receive and discharge hydraulic fluid so that the device can function as a pump or motor. A shaft or other mechanical device can be connected to either the inner or outer gear depending upon the type of device. The hydraulic actuator assemblies further include a hydraulic piston member for frictionally loading the friction clutch.

While known hydraulic couplings, including but not limited to those discussed above, have proven to be acceptable for various vehicular driveline applications, such devices are nevertheless susceptible to improvements that may enhance their performance and cost. With this in mind, a need exists to develop improved hydraulic couplings and driveline apparatuses that advance the art.

Moreover, there is a problem with the current hydraulic coupling in that they do not have a simple on/off capability, which is separate and distinct from the hydraulic pressure supply/control circuit actuating the clutch assemblies. Therefore, it is the intent of this invention to overcome these shortcomings by providing an external control of the hydraulic pressure generated within a hydraulically actuated limited slip coupling in which the limited slip clutch can either be turned on or off, or set at any intermediate condition by controlling the maximum system hydraulic pressure limit.

SUMMARY OF THE INVENTION

The present invention provides an improved torque-coupling device for a drivetrain of an all wheel drive (AWD) motor vehicle including an internal combustion engine coupled to a transaxle of a primary full-time drive axle assembly, a power transfer unit, a propeller shaft transmitting engine torque to a selectively operable secondary, on-demand drive axle assembly, and the torque-coupling device for selectively, on demand activating of the secondary drive axle assembly of the all-wheel drive motor vehicle and providing an infinitely variable torque distribution between the primary and secondary axle assemblies of the AWD motor vehicle.

The torque-coupling device in accordance with the present invention comprises a hollow housing, an input shaft and an output shaft both rotatably supported within the housing, a hydraulically operated, selectively engageable friction clutch assembly for frictionally coupling the input shaft to the output shaft, and a hydraulic clutch actuator. The hydraulic actuator includes a speed sensitive, positive displacement hydraulic pump located within the casing and adapted to generate a hydraulic pressure to frictionally load the friction clutch assembly, a piston assembly for axially loading the clutch pack, and a variable pressure relief valve assembly fluidly communicating with the hydraulic pump to selectively control the hydraulic discharge pressure generated by the pump. The friction clutch assembly and the hydraulic pump are disposed within a clutch casing drivingly coupled to the output shaft. Alternatively, the clutch casing may be drivingly coupled to the input shaft.

The variable pressure relief valve assembly includes a valve closure member, a valve seat complementary to said valve closure member, and an electro-magnetic actuator adapted for selectively varying a release pressure of the pressure relief valve assembly between a maximum release pressure when the friction clutch pack is in the fully "ON" condition, and a minimum release pressure when the friction clutch pack is in the fully "OFF" condition based on a magnitude of an electric current applied to the electro-magnetic actuator.

The electro-magnetic actuator includes a coil winding supported by the clutch casing and an armature radially spaced from said coil winding and axially movable relative thereto in response to a magnetic flux generated by said coil winding when said electrical current is supplied thereto, said armature engages said valve closure member and urges thereof against said valve seat with an axial force determined by said magnitude of said electric current for selectively setting up said release pressure of said valve closure member.

The variable pressure relief valve assembly is operated by an electro-magnetic (preferably, solenoid) actuator electronically controlled by a coupling control module (CCM) based on one or more vehicle parameters as control inputs, such as a vehicle speed, a wheel speed difference, vehicle yaw rate, a vehicle lateral acceleration, a steering angle, an engine throttle position, a brake application, an ice detection, a moisture detection, a vehicle driveline configuration, a vehicle yaw stability control system and an anti-lock brake system/traction control system (ABS/TCS). When energized, the solenoid-operated valve assembly is capable of modulating a pump discharge pressure in a variable range from a minimum pressure to a maximum pressure, thereby selectively and variably controlling a drive torque applied to the output axle shafts in a range from a minimum torque value to a maximum torque value.

In accordance with the first exemplary embodiment of the present invention, the housing of the torque-coupling device of the present invention is secured to an axle housing of the secondary drive axle assembly, an input shaft is drivingly coupled to the propeller shaft of the AWD motor vehicle, and the output shaft is, preferably, in the form of a pinion shaft of the secondary drive axle assembly.

In accordance with the second exemplary embodiment of the present invention, the housing of the torque-coupling device of the present invention is secured to a housing of the power transfer unit, the input shaft is in the form of an output shaft of the power transfer unit, and the output shaft drivingly coupled to the propeller shaft.

Therefore, the selectively operable, secondary drive axle torque-coupling device for the AWD motor vehicles in accordance with the present invention represents a novel arrangement of the hydraulically actuated AWD torque-coupling device provided with an electro-magnetic actuator for activating a variable pressure relief valve for allowing selective actuation of the secondary drive axle and infinitely variable torque distribution between the primary and secondary drive axles of the AWD motor vehicle.

BRIEF DESCRIPTION OF THE DRAWINGS

Other objects and advantages of the invention will become apparent from a study of the following specification when viewed in light of the accompanying drawings, wherein.

DETAILED DESCRIPTION OF PREFERRED EMBODIMENTS

The preferred embodiments of the present invention will now be described with the reference to accompanying drawings.

Figure 1:
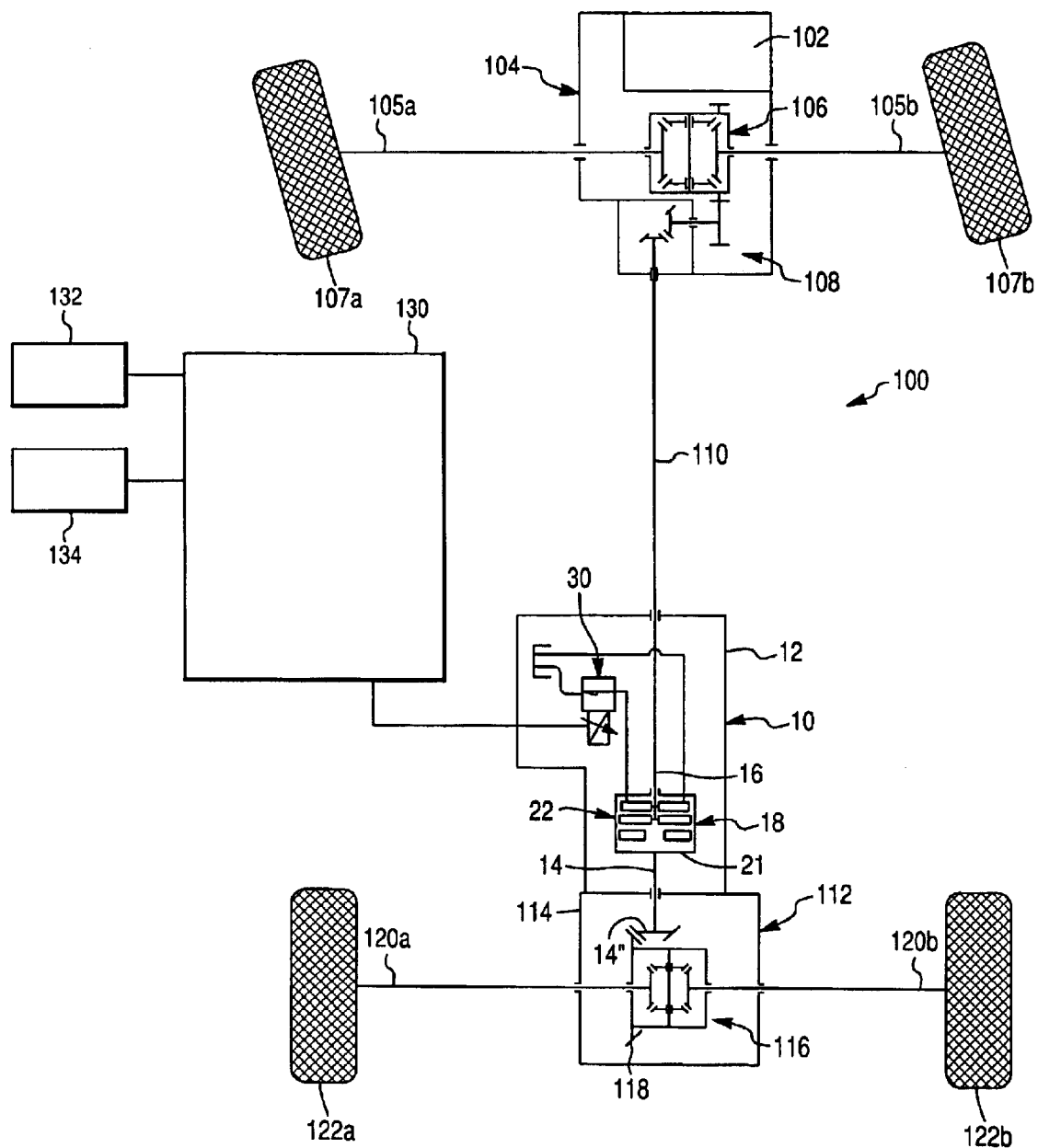
FIG. 1 is a schematic diagram showing a drivetrain of an all-wheel drive motor vehicle in accordance with the first exemplary embodiment of the present invention.

FIG. 1 schematically depicts a drivetrain 100 of a all-wheel drive (AWD) motor vehicle in accordance with the first exemplary embodiment of the present invention. However, it is to be understood that while the present invention is described in relation to the all-wheel drive motor vehicle, the present invention is equally suitable for use in other hydraulically actuated friction couplings utilizing a speed sensitive hydraulic actuator.

The AWD drivetrain 100 comprises an internal combustion engine 102 mounted to a front end of the motor vehicle and coupled to a transaxle 104 of a front (primary) full-time axle, a power transfer unit 108, a propeller shaft 110 and a selectively operable rear (secondary) on-demand axle assembly 112. However, it should be noted that the present invention could be used on a rear wheel drive primary driven axle vehicle or any other all-wheel drive or all wheel drive vehicle. The transaxle 104 includes a front differential 106 rotated by a drive torque from the engine 102, and two front axle shafts 105a and 105b outwardly extending from the front differential 106 and drivingly coupled to front wheels 107a and 107b, respectively. The auxiliary axle assembly 112 includes a rear differential assembly 116 and two rear (secondary) axle shafts 120a and 120b outwardly extending from the rear differential 116 and drivingly coupled to rear wheels 122a and 122b, respectively.

The drivetrain 100 further includes a selectively operable, hydraulically actuated torque-coupling device 10 adapted to selectively actuate the rear, secondary drive axle 112 of the AWD motor vehicle only when slippage of the wheels 107a and 107b occurs with the primary axle.

The torque-coupling device 10 includes a hollow housing 12 secured to the axle housing 114 of the secondary axle assembly 112, an input shaft 16 and an output shaft, preferably in the form of a pinion shaft 14 of the secondary axle assembly 112. Both the input shaft 16 and the pinion shaft 14 are rotatably supported within the casing 12. The input shaft 16 is drivingly coupled to the propeller shaft 110 transmitting a drive torque from the engine 102 to the input shaft 16 through the transaxle 104, the power transfer unit 108 and the propeller shaft 110. A pinion gear 14" of the pinion shaft 14 drivingly engages a ring gear 118 of the differential 116.

The torque-coupling device 10 further includes a limited slip device disposed within the casing 12. Preferably, the limited slip device is in the form of a hydraulically actuated friction clutch assembly 18. The friction clutch assembly 18 operatively and selectively connects the propeller shaft 110 and the rear differential 116. The clutch assembly 18 is selectively actuated by a corresponding hydraulic clutch actuator 22.

Figure 2:
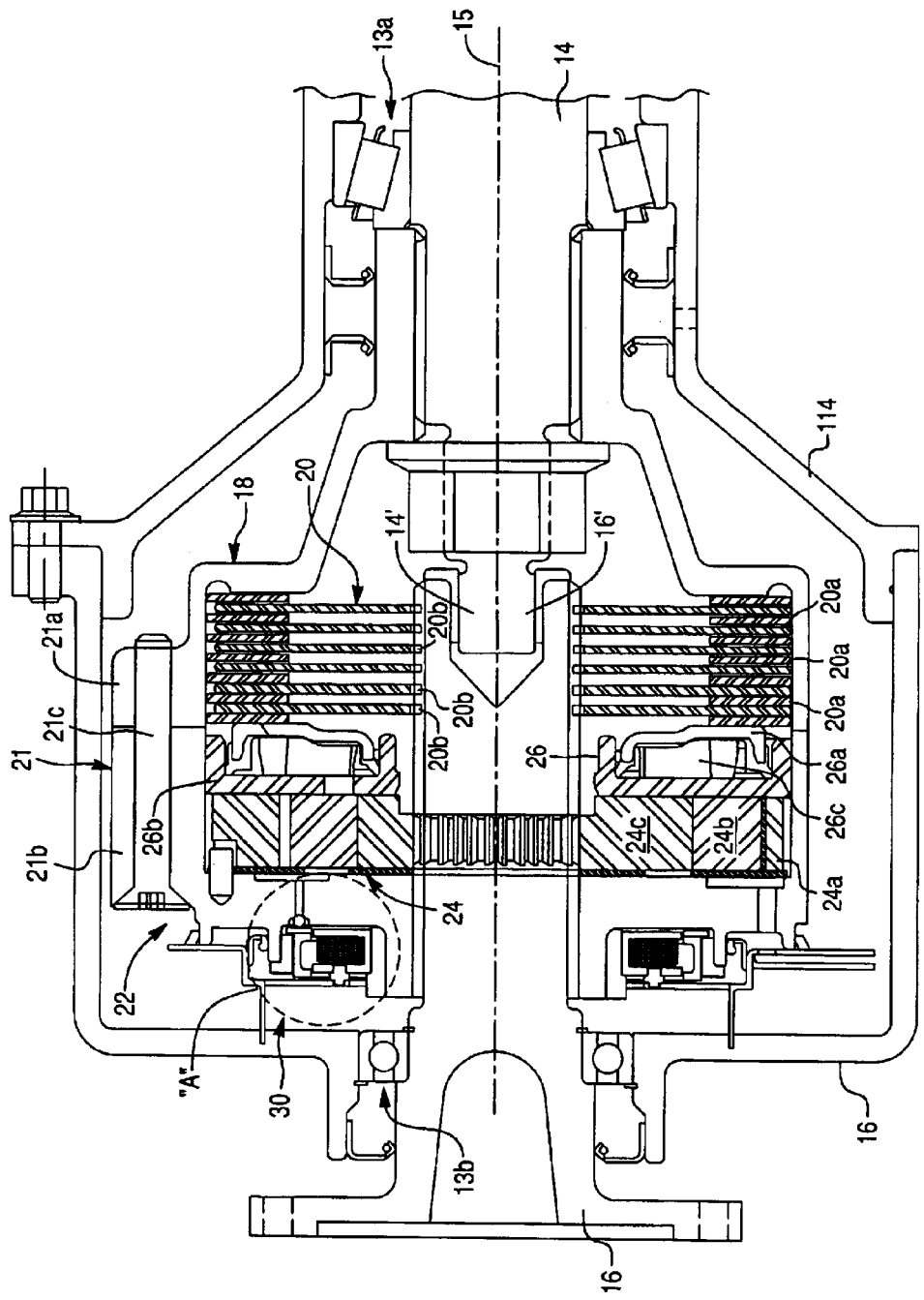
FIG. 2 is a sectional view of a hydraulically actuated torque-coupling device in accordance with the preferred embodiment of the present invention.

FIG. 2 illustrates in detail the selectively operable, hydraulically actuated torque-coupling device 10. It is to be understood that while the present invention is described in relation to the secondary drive axle of the AWD motor vehicle, the present invention is equally suitable for use in other hydraulically actuated friction couplings, such as torque coupling mechanisms for a gear-train utilizing a speed sensitive limited slip device.

The torque-coupling device 10, as was disclosed above, includes the hollow housing 12 that is, preferably, fastened to the axle housing 114 of the secondary drive axle 112 of the AWD motor vehicle. Disposed within the housing 12 are the output shaft in the form of the final drive pinion shaft 14 driving the ring gear 118 of the differential assembly 116 of the secondary drive axle 112, the input shaft 16, the limited slip device in the form of the hydraulically actuated friction clutch assembly 18 adapted for engaging and disengaging the input shaft 16 and the drive pinion shaft 14, and the hydraulic clutch actuator 22 for selectively frictionally loading the friction clutch assembly 18. The drive pinion shaft 14 is supported within the housing 12 for rotation about a longitudinal axis 15 through an anti-friction bearing 13a. The input shaft 16 is rotatably supported within the housing 12 through an anti-friction bearing 13b and is substantially coaxial to the drive pinion shaft 14. A front-end portion 14' of the drive pinion shaft 14 is rotatably supported by a rear-end portion 16' of the input shaft 16.

The hydraulically actuated friction clutch assembly 18 is disposed within a clutch casing 21 for selectively frictionally coupling the input shaft 16 to the clutch casing 21. Preferably, the clutch casing 21 is drivingly coupled to the drive pinion shaft 14, thus operatively connecting the input shaft 16 to the drive pinion shaft 14 when the friction clutch assembly 18 is engaged. Alternatively, the clutch casing 21 may be drivingly coupled to the input shaft 16. Preferably, the clutch casing 21 is formed of two halves 21a and 21b secured to each other by any appropriate manner known in the art, such as by bolts 21c.

In accordance with the preferred embodiment of the present invention, the hydraulic friction clutch assembly 18 is hydraulically actuated multi-plate clutch assembly including a friction clutch pack 20. The friction clutch pack 20, well known in the prior art, includes sets of alternating outer friction plates 20a and inner friction plates 20b. Conventionally, an outer circumference of the outer friction plates 20a is provided with projections that non-rotatably engages corresponding grooves formed in the clutch casing 21. Similarly, an inner circumference of the inner friction plates 20b is provided with projections that non-rotatably engage corresponding grooves formed in the input shaft 16. At the same time, both the outer friction plates 20a and the inner friction plates 20b are slideable in the axial direction. The clutch plates 20a frictionally engage the clutch plates 20b to form a torque coupling arrangement between the casing 21 and the input shaft 16.

Furthermore, the hydraulic clutch actuator 22 selectively actuates the clutch assembly 18. Preferably, the hydraulic clutch actuator 22 includes a speed sensitive positive displacement hydraulic pump 24 providing a pressurized hydraulic fluid, a piston assembly 26 for axially loading the clutch pack 20, and a variable pressure relief valve assembly 30 for selectively controlling a discharge pressure of the pump 24 and, subsequently, the clutch pack 20.

The variable pressure relief valve assembly 30 is operated by an electro-magnetic (preferably, solenoid) actuator electronically controlled by a coupling control module (CCM) 130 (shown in FIG. 1) based on one or more vehicle parameters as control inputs 134, such as a vehicle speed, a wheel speed difference, vehicle yaw rate, a vehicle lateral acceleration, a steering angle, an engine throttle position, a brake application, an ice detection, a moisture detection, a vehicle driveline configuration, a vehicle yaw stability control system and an anti-lock brake system/traction control system (ABS/TCS). The CCM 130 is also connected to a source of an electric power supply, such as an electric storage battery 132 mounted on the motor vehicle. When energized, the variable pressure relief valve assembly 30 is capable of continuously modulating a discharge pressure of the pump 24 in a variable range from a minimum pressure to a maximum pressure, thereby selectively and variably controlling a drive torque applied to the pinion shaft 14 in a range from a minimum torque value to a maximum torque value.

The speed sensitive hydraulic displacement pump 24 disposed within the clutch casing 21 actuates the clutch pack 20 when the relative rotation between the input shaft 16 and the drive pinion shaft 14 occurs. It will be appreciated that a hydraulic pressure generated by the pump 24 is substantially proportional to a rotational speed difference between the input shaft 16 and the drive pinion shaft 14. Preferably, the hydraulic displacement pump 24 employed to provide pressurized hydraulic fluid to actuate the clutch pack 20 is a bi-directional gerotor pump. The gerotor pump 24 includes an outer ring member 24a, an outer rotor 24b, and an inner rotor 24c. The inner rotor 24c drivingly coupled (i.e., keyed or splined) to the input shaft 16, and the outer ring member 24a is secured (i.e., keyed or splined) to the clutch casing 21. The inner rotor 24c has a plurality of external teeth that rotate concentrically relative to the input shaft 16 about the axis 15. The outer rotor 24b includes a plurality of internal teeth and has an outer circumferential edge surface that is journally rotatably supported within a circular internal bore formed in the outer ring member 24a. Preferably, the inner rotor 24c has one less tooth than the outer rotor 24b and when relative rotation between the inner rotor 24c and the outer ring member 24a occurs, it causes eccentric rotation of the outer rotor 24b, which can freely rotate within the outer ring member 24a eccentrically with respect to the inner rotor 24c, thus providing a series of decreasing and increasing volume fluid pockets by means of which fluid pressure is created. Therefore, when relative motion takes place between the drive pinion shaft 14 and the input shaft 16, the inner rotor 24c of the gerotor pump 24 generates hydraulic fluid pressure. However, it will be appreciated that any other appropriate type of hydraulic pump generating the hydraulic pressure in response to the relative rotation between the drive pinion shaft 14 and the input shaft 16 is within the scope of the present invention.

The piston assembly 26 including a hydraulically actuated piston 26a disposed within a piston housing 26b, serves to compress the clutch pack 20 and retard any speed differential between the drive pinion shaft 14 and the input shaft 16. Pressurized hydraulic fluid to actuate the piston 26a and engage the clutch pack 20 is provided by the gerotor pump 24. In such an arrangement, when a speed difference between the drive pinion shaft 14 and the input shaft 16 exists, the hydraulic fluid is drawn into the pump 24 through a suction passage. The gerotor pump 24 pumps the pressurized fluid into a piston pressure chamber 26c defined between the piston 26a and the piston housing 26b to actuate the clutch pack 20. As the speed difference increases, the pressure increases. The pressurized fluid in the piston pressure chamber 26c creates an axial force upon the piston 26a for applying a compressive clutch engagement force on the clutch pack 20, thereby transferring drive torque from the input shaft 16 to the drive pinion shaft 14 through the clutch casing 21. The amount of torque transfer (i.e., the torque ratio or split) is progressive and continuously variable and is proportional to the magnitude of the clutch engagement force exerted by the piston 26a on the clutch pack 20 which, in turn, is a function of the fluid pressure within the piston chamber 26c. Moreover, the magnitude of the fluid pressure within piston pressure chamber 26c, as delivered thereto by the hydraulic pump 24, is largely a function of the speed differential between the input shaft 16 and the drive pinion shaft 14.

As noted above, in order to control the fluid pressure within the piston pressure chamber 26c and, subsequently, the output torque distribution of the auxiliary drive axle torque-coupling device 10, the hydraulic clutch actuator 22 is provided with the variable pressure relief valve assembly 30. As illustrated in detail in FIG. 3, the variable pressure relief valve assembly 30 according to the present invention is in the form of an electro-magnetic valve assembly disposed within the housing 12 and comprises a pressure relief check valve 32 controlled by an electro-magnetic actuator 34 that may be any appropriate electro-magnetic device well known in the art, such as a solenoid.

The check valve 32 comprises a fluid relief passageway 36 that is in fluid communication with the piston pressure chamber 26c, a substantially conical valve seat 38 that is in open communication with the passageway 36, and a spherical valve closure member 40 adapted to seat in the valve seat 38 for sealing the fluid relief passageway 36. It will be appreciated that the valve closure member 40 may be in any appropriate form other than spherical, such as conical. The valve seat 38 is formed in an outer side surface of the half member 21b of the clutch casing 21. The valve closure member 40 is movable between a closed position when the valve closure member 40 engages the valve seat 38 (as shown in FIG. 3), and an open position when the valve closure member 40 is axially spaced from the valve seat 38.

The electro-magnetic actuator 34 comprises a substantially annular coil housing 42, a coil winding 44 wound about the coil housing 42, and a substantially annular armature 52 axially movable in the direction of the axis 15. The armature 52 is coaxial to the coil winding 44 and is radially spaced from the coil housing 42, thus defining an air gap 56. The coil housing 42 is supported by the clutch casing 21 substantially coaxially to the axis 15 through a coil housing bushing 50 for rotation relative to the clutch casing 21. At the same time, the coil housing 42 is non-rotatable relative to the coupling housing 12. The coil housing 42 is preferably formed of a single or a plurality of laminations of a magnetically permeable material, such as conventional ferromagnetic materials. The coil housing bushing 50 is made of any appropriate non-magnetic material well known to those skilled in the art. In order to non-rotatably secure the coil housing 42 to the axle housing (not shown), an anti-rotation pin 46 is employed for non-rotatably coupling the coil housing 42 to an anti-rotation plate 48 fixed to the axle housing (not shown).

The annular armature 52 is supported within an armature bushing 54 for axial movement in the direction of the axis 15. The armature bushing 54 is non-rotatably mounted to the clutch casing 21 by any appropriate means, such as press-fitting, adhesive bonding, etc. Preferably, the armature bushing 54 is made of any appropriate non-magnetic material well known to those skilled in the art.

Figure 3:
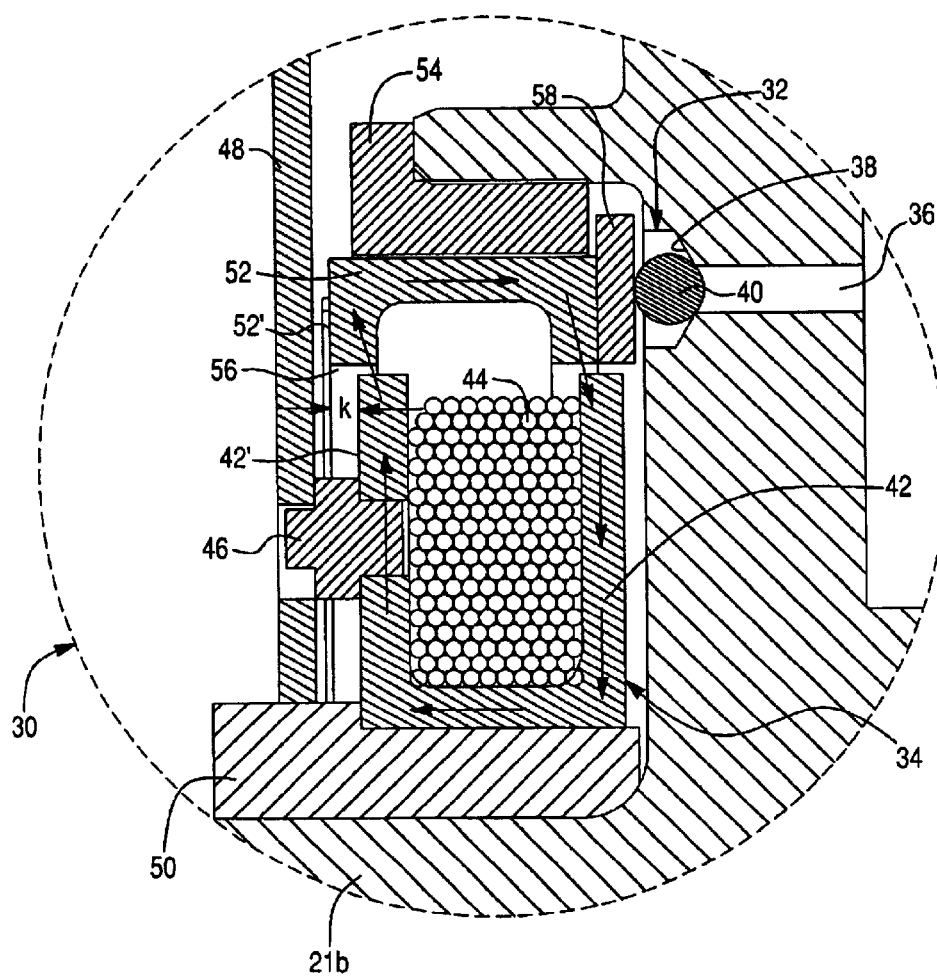
FIG. 3 is an enlarged partial sectional view of a variable pressure relief valve assembly shown in a circle 'A' in FIG. 2.

In the exemplary embodiment illustrated in FIGS. 2 and 3, the armature 52 is radially disposed outside the coil housing 42 of the electro-magnetic actuator 34. Alternatively, the armature 52 may be disposed within the coil housing 42.

The valve closure member 40 is urged and held in place against the valve seat 38 by an actuator plate 58. In turn, the actuator plate 58 is adapted to engage the armature 52 of the electro-magnetic actuator 34 radially disposed outside the coil housing 42 thereof. Preferably, the actuator plate 58 is in the shape of an annular segment and is made of any appropriate non-magnetic material well known to those skilled in the art. Furthermore, the actuator plate 58 is fastened to the armature 52 by any appropriate means known in the art, such as threaded connectors, adhesive bonding, etc.

When electrical current is supplied to the coil winding 44, a magnetic flux is caused to flow through the armature 52. The magnetic flux creates an axial force that axially displaces the armature 52 relative to the coil housing 42. The armature 52 urges the valve closure member 40 upon the valve seat 38 with a predetermined axial retaining force that is a function of the electrical current supplied to the coil winding 44. It will be appreciated by those skilled in the art that the pressurized hydraulic fluid will not flow through the pressure relief valve 32 until the hydraulic pressure generated by the gerotor pump 24 results in a reaction force larger than the axial retaining force exerted to the armature 52 by the magnetic flux generated by the coil winding 44, thereby pushing the valve closure member 40 out of the valve seat 38. Therefore, such an arrangement creates a relief valve with a release pressure that is a function of the current supplied to the coil winding 44, and provides a predetermined pressure limit in the hydraulic system. Thus, the variable pressure relief valve assembly 30 selectively sets the release pressure of the pressure relief valve 32 as a function of the electrical current supplied to the coil winding 44 and, subsequently, defines the magnitude of the pressure within the piston pressure chamber 26c.

It will be appreciated by those skilled in the art that the armature 52 may have any appropriate shape in the cross-section. Preferably, as illustrated in the exemplary embodiment of FIG. 3, the armature 52 has a generally U-shaped cross-section with magnetic poles facing the coil housing 42, similar to those used in reluctance electric motors. Moreover, the mutual geometric arrangement of the armature 52 and the coil housing 42 is such as to maintain a substantially constant axial force applied upon the valve closure member 40 by the electro-magnetic actuator 34 as it moves from its closed to open position. This is achieved by maintaining a proper "off-set" between the armature 52 and the coil housing 42 (and, consequently, the coil winding 44). The term "off-set" is determined here as an amount of misalignment between the armature 52 and the coil housing 42, or a distance k between an outward face 42' of the coil housing 42 and an outward face 52' of the armature 52, as illustrated in FIG. 3.

Figure 4:
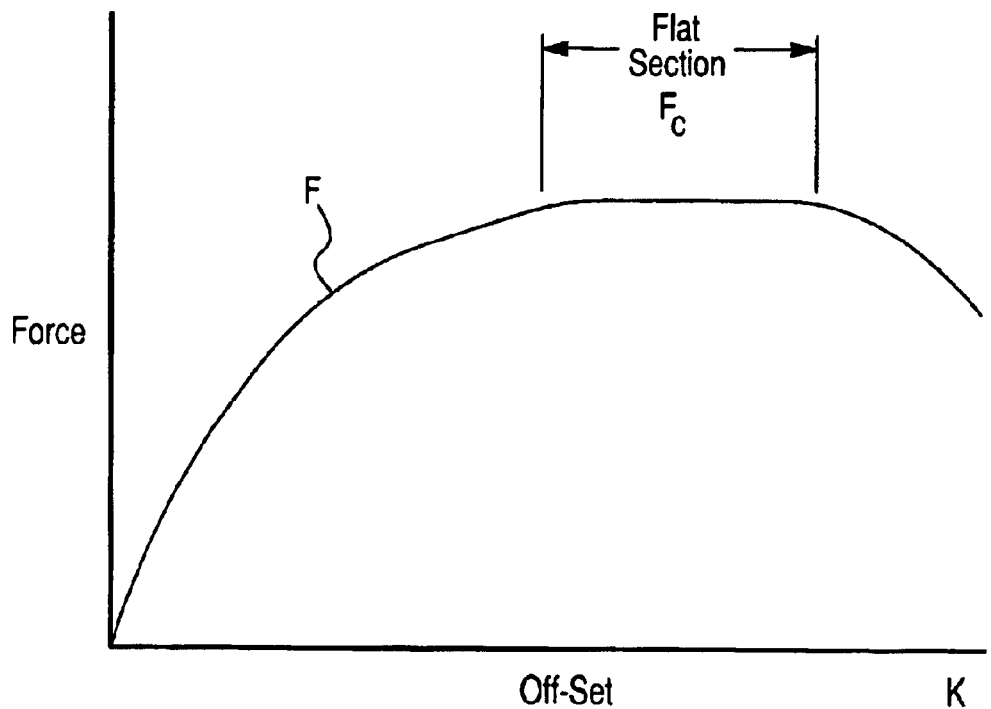
FIG. 4 is a graph showing an axial force applied upon a valve closure member by an electro-magnetic actuator as a function of "off-set" between a coil housing and an armature.

FIG. 4 depicts a graph showing the axial force applied upon the valve closure member 40 by the electro-magnetic actuator 34 as a function of the "off-set" distance k while a constant magnitude of electric current is supplied to the coil winding 44. The graph is in the form of a curved line F having a substantially "flat" section Fc wherein the axial force varies insignificantly with respect to the "off-set" distance k. However, operation outside of this section $F_C$ results in an abrupt change of the axial force. Thus, while the electro-magnetic actuator 34 of the relief valve assembly 30 is operated in the "flat" section $F_C$, the axial force applied upon the valve closure member 40 by the electro-magnetic actuator 34 is substantially constant as it moves from its closed to open position, and is a function of the electrical current supplied to the coil winding 44. On the other hand, operation outside of this "flat" section $F_C$ results in the axial force being a function of both the current and the "off-set" distance k that would make control of the variable pressure relief valve more difficult requiring a closed loop feedback as to the valve's "off-set". Other, more traditional solenoid pole designs do not provide this "flat" section in the axial force versus "off-set" distance curve.

For the above described reason, the electro-magnetic actuator 34 in accordance with the preferred embodiment of the present invention is arranged to provide the "off-set" distance k between the coil housing 42 and the armature 52 within the "flat" section $F_C$ of the axial force versus "off-set" distance curve so as to ensure that the axial force applied upon the valve closure member 40 by the electro-magnetic actuator 34 is substantially constant as it moves from its closed to open position, and is a function only of the electrical current supplied to the coil winding 44.

When a maximum current is applied to the coil winding 44 of the solenoid actuator 34, the retaining force of the pressure relief valve 32 is at its maximum, thus a maximum release pressure is provided by the pressure relief check valve 32. In this configuration, the maximum pressure attainable within the piston pressure chamber 26c is sufficient to fully actuate the friction clutch pack 20 which results in fully engaging the friction clutch pack of the torque-coupling device 10, and the limited slip feature is in the fully "ON" condition.

The pressure limit of the pressure relief valve 32, i.e. the release pressure of the pressure relief valve 32, can be adjusted by controlling the current applied to the coil winding 44 of the electro-magnetic actuator 34.

As the less current is applied to the coil winding 44, the less axial retaining force is exerted to the relief valve 32, thus the less is the release pressure provided by the relief valve 32. This results in an adjustment mechanism for lowering the maximum system pressure attainable within the piston pressure chamber 26c.

When a minimum current is applied to the coil winding 44 of the solenoid actuator 34, the retaining force of the pressure relief valve 32 is at its minimum, thus a minimum release pressure is provided by the relief valve 32. In this configuration, the limited slip feature is in the fully "OFF" condition in that the maximum pressure which can be obtained in the piston pressure chamber 26c is not high enough to engage the friction clutch pack 20, thus effectively disabling the clutch pack 20 and essentially disconnecting the torque-coupling device 10.

In between the "ON" and "OFF" conditions of the torque-coupling device 10, the release pressure of the relief valve 32 may be set at any value between these limits by modulating the current applied to the coil winding 44 of the solenoid actuator 34. This provides the torque-coupling device 10 with an infinitely variable maximum pressure limit in which the amount of the limited slip available to the torque-coupling device 10 can be limited and optimized to match various vehicle operating conditions. This provides an opportunity to dynamically control the hydraulic pressure for traction enhancement. For example, if the release pressure is set at a low value, a control system can be used to sense wheel speeds or speed differences and allow for increased hydraulic pressure. The increase in pressure available may be a function of the speed difference. This will result in an optimized amount of limited slip between the fully "ON" and "OFF" conditions.

During normal operation, the torque-coupling device 10 is in the "OFF" position as the minimum current is applied to the variable pressure relief valve assembly 30, thus disabling the clutch pack 20. However, if the wheels 107a and 107b of the primary axle loses traction, the CCM 130 issues a signal to the variable pressure relief valve assembly 30 to set the torque-coupling device 10 in the "ON" position. This will set the maximum release pressure provided by the relief valve 32. The differential speed between the input shaft 16 and the drive pinion shaft 14 will result in the hydraulic pump 24 delivering pressurized fluid to the piston 26a, and the friction clutch pack 20 will be engaged. With the clutch pack 20 engaged, the wheels 122a and 122b of the secondary axle assembly 112 of the vehicle will be driven.

Therefore, in accordance with the present invention, the AWD system is actuated only when the vehicle input sensors sense a reduction in traction at the front wheels 107a and 107b. Also, the AWD system may by actuated manually by a vehicle operator.

Moreover, when energized, the solenoid-operated valve assembly 30 is capable of modulating a pump discharge pressure in a variable range from a minimum pressure to a maximum pressure, thereby selectively and variably controlling a drive torque applied to the wheels of the auxiliary axle in a range from a minimum torque value to a maximum torque value. Thus, the torque coupling in accordance with the present invention allows infinitely variable torque distribution between the primary axle and the secondary axle.

Figure 5:
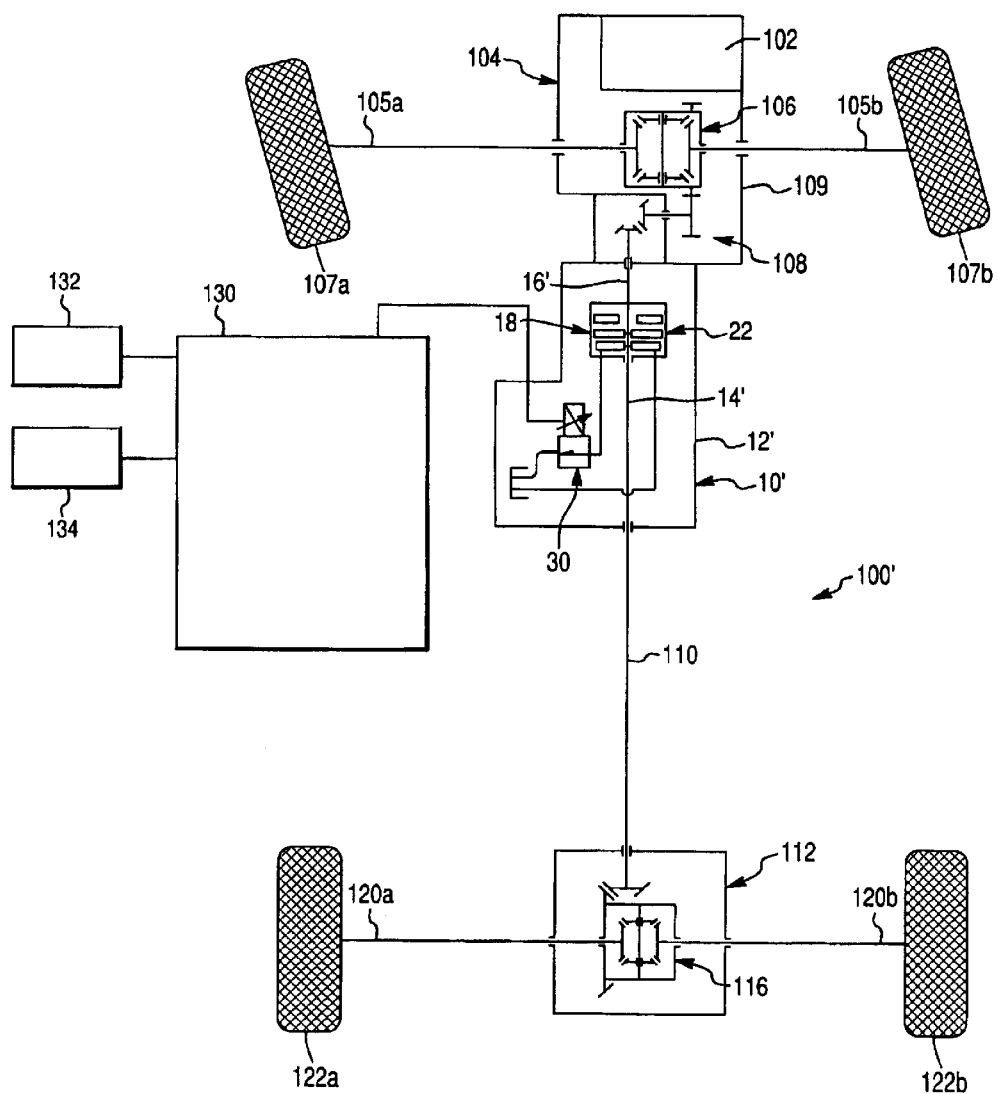
FIG. 5 is a schematic diagram showing a drivetrain of the all-wheel drive motor vehicle in accordance with the second exemplary embodiment of the present invention.

FIG. 5 of the drawings depicts the second exemplary embodiment of the present invention. Components, which are unchanged from, or function in the same way as in the first exemplary embodiment depicted in FIGS. 1–4 are labeled with the same reference numerals, sometimes without describing detail since similarities between the corresponding parts in the two embodiments will be readily perceived by the reader.

The AWD drivetrain 100' of the second exemplary embodiment of the present invention comprises the internal combustion engine 102 mounted to a front end of the motor vehicle and coupled to the transaxle 104 of a front (primary) full-time axle, the power transfer unit 108, the propeller shaft 110 and the selectively operable rear (secondary) on-demand axle assembly 112. The transaxle 104 includes a front differential 106 rotated by a drive torque from the engine 102, and two front axle shafts 105a and 105b outwardly extending from the front differential 106 and drivingly coupled to the front wheels 107a and 107b, respectively. The auxiliary axle assembly 112 includes a rear differential assembly 116 and two rear (secondary) axle shafts 120a and 120b outwardly extending from the rear differential 116 and drivingly coupled to the rear wheels 122a and 122b, respectively.

The drivetrain 100' further includes a selectively operable, hydraulically actuated torque-coupling device 10' adapted to selectively actuate the rear, secondary drive axle 112 of the AWD motor vehicle only when slippage of the wheels 107a and 107b occurs with the primary axle. The torque-coupling device 10' of the second exemplary embodiment of the present invention includes a hollow housing 12' secured to a housing 109 of the power transfer unit 108, an input shaft 16' in the form of an output shaft of the power transfer unit 108, and an output shaft 14' drivingly coupled to the propeller shaft 110. Both the input shaft 16' and the pinion shaft 14' are rotatably supported within the housing 12'.

The torque-coupling device 10' further includes a limited slip device disposed within the housing 12'. Preferably, the limited slip device is in the form of a hydraulically actuated friction clutch assembly 18. The friction clutch assembly 18 operatively and selectively connects the output shaft of the power transfer unit 108 to the propeller shaft 110. The clutch assembly 18 is selectively actuated by a corresponding hydraulic clutch actuator 22.

The friction clutch assembly 18 and the hydraulic clutch actuator 22 of the second exemplary embodiment of the present invention are unchanged from and function in the same way as in the first exemplary embodiment depicted in FIGS. 1–4.

Therefore, the selectively operable secondary drive axle coupling assembly for the AWD motor vehicles in accordance with the present invention represents a novel arrangement of the hydraulically actuated AWD coupling assembly provided with an electro-magnetic actuator for activating a variable pressure relief valve for allowing selective actuation of the auxiliary drive axle and infinitely variable torque distribution between the primary and secondary drive axles of the AWD motor vehicle.

The foregoing description of the preferred embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A torque-coupling device for selectively, on-demand actuating of a secondary drive axle assembly of a all-wheel-drive motor vehicle, said torque coupling device comprising:
    a hollow housing;
    an input shaft and an output shaft both rotatably supported within said housing;
    a clutch casing drivingly coupled to one of said input shaft and said output shaft;
    a friction clutch assembly disposed within said clutch casing for selectively frictionally engaging and disengaging said input shaft and said output shaft, said clutch assembly comprising at least one first member coupled to rotate with said input shaft and at least one second member coupled to rotate with said output shaft, said members being frictionally engageable with one another; and
    hydraulic clutch actuator for selectively frictionally loading said friction clutch assembly, said actuator comprising:
        a hydraulic pump disposed within said clutch casing to generate a hydraulic pressure to frictionally load said friction clutch assembly; and
        a variable pressure relief valve assembly fluidly communicating with said hydraulic pump to selectively control said hydraulic pressure,
        wherein said variable pressure relief valve assembly including a valve closure member, a valve seat complementary to said valve closure member and an electro-magnetic actuator for engaging said valve closure member and urging thereof against said valve seat so as to selectively vary a release pressure of said pressure relief valve assembly based on a magnitude of an electric current supplied to said electro-magnetic actuator, said valve closure member is movable between a closed position when said valve closure member engages said valve seat and an open position when said valve closure member is axially spaced from said valve seat, and
        wherein said electro-magnetic actuator including a coil winding and an armature axially movable relative thereto in response to a magnetic flux generated by said coil winding when said electrical current is supplied thereto, said armature engages said valve closure member and urges said valve closure member against said valve seat with an axial force determined by said magnitude of said electric current for selectively setting up said release pressure of said valve closure member.

2. The torque-coupling device as defined in claim 1, wherein said valve seat is provided on said clutch casing.

3. The torque coupling device as defined in claim 1, wherein said coil winding is wound about a coil housing mounted to said clutch casing and said armature is radially spaced from said coil housing.

4. The torque coupling device as defined in claim 3, wherein said coil housing is rotatably mounted to an outer peripheral surface of said clutch casing coaxially to an axis of rotation of said casing.

5. The torque coupling device as defined in claim 3, wherein said armature is non-rotatably coupled to said clutch casing.

6. The torque coupling device as defined in claim 3, wherein said armature is disposed outside said coil housing of said electro-magnetic actuator.

7. The torque coupling device as defined in claim 3, wherein said armature is substantially annular in shape and is mounted substantially coaxially to said coil housing.

8. The torque coupling device as defined in claim 1, wherein said friction clutch assembly is a friction clutch pack including a plurality of inner friction plates coupled to rotate with said input shaft and a plurality of outer friction plate coupled to rotate with said clutch casing, said clutch casing is drivingly coupled to said output shaft, said friction plates being frictionally engageable with one another.

9. The torque coupling device as defined in claim 1, wherein said hydraulic pump is a positive displacement hydraulic pump disposed within said casing, said hydraulic pump generates a hydraulic pressure in response to relative rotation between said clutch casing and said input shaft.

10. The torque coupling device as defined in claim 9, wherein said pump is a bi-directional gerotor pump.

11. The torque coupling device as defined in claim 1, wherein said variable pressure relief valve assembly is adapted to selectively set a maximum hydraulic pressure generated by said hydraulic pump between a maximum release pressure and a minimum release pressure.

12. The torque coupling device as defined in claim 11, wherein said minimum release pressure is at a level that prevents actuation of said friction clutch assembly.

13. The torque coupling device as defined in claim 11, wherein said maximum release pressure is at a level that enables complete actuation of said friction clutch assembly.

14. The torque coupling device as defined in claim 11, wherein said maximum hydraulic pressure generated by said hydraulic pump is adjustable between said minimum release pressure and said maximum release pressure so as to enable partial actuation of said friction clutch assembly.

15. The torque coupling device as defined in claim 1, wherein said hydraulic clutch actuator further including a piston assembly disposed within said clutch casing between said pump and said clutch assembly and defining a pressure chamber, wherein said variable pressure relief valve assembly selectively controls a maximum hydraulic pressure attainable within said pressure chamber.

16. The torque coupling device as defined in claim 15, wherein said variable pressure relief valve assembly selectively controls said maximum pressure attainable within said pressure chamber between a maximum release pressure and a minimum release pressure.

17. The torque coupling device as defined in claim 16, wherein said minimum release pressure is at a level that prevents actuation of said friction clutch assembly.

18. The torque coupling device as defined in claim 16, wherein said maximum release pressure is at a level that enables complete actuation of said friction clutch assembly.

19. The torque coupling device as defined in claim 16, wherein said maximum hydraulic pressure attainable within said pressure chamber is adjustable between said minimum release pressure and said maximum release pressure so as to enable partial actuation of said friction clutch assembly.

20. The torque coupling device as defined in claim 3, wherein said armature has a substantially U-shaped cross-section.

21. The torque coupling device as defined in claim 3, wherein said coil housing is rotatably mounted to said clutch casing.

22. The torque coupling device as defined in claim 3, wherein said armature is off-set from said coil housing to a distance that ensures that said axial force applied upon said valve closure member by said electro-magnetic actuator is substantially constant as said valve closure member moves from said closed position to said open position and said axial force is a function only of said electrical current supplied to said coil winding.

23. The torque coupling device as defined in claim 1, wherein said variable pressure relief valve assembly selectively controls said hydraulic pressure generated by hydraulic pump in response to at least one vehicle parameter.

24. The torque coupling device as defined in claim 23, wherein said at least one vehicle parameter is selected from the group consisting of a vehicle speed, a wheel speed difference, a vehicle yaw rate, a steering angle, an engine throttle position, a vehicle lateral acceleration, a brake application, an ice detection, a moisture detection, a driveline configuration, an anti-lock brake system/traction control system actuation, and a vehicle yaw stability control system actuation.

25. The torque-coupling device as defined in claim 1, wherein said housing is fastened to an axle housing of said secondary drive axle assembly.

26. The torque-coupling device as defined in claim 1, wherein said housing is fastened to a housing of a power transfer unit of said all-wheel-drive motor vehicle.

27. The torque-coupling device as defined in claim 1, wherein said input shaft is drivingly coupled to a propeller shaft of said motor vehicle and said output shaft is a drive pinion shaft of said secondary drive axle assembly.

28. The torque-coupling device as defined in claim 1, wherein said input shaft is an output shaft of a power transfer unit of said all-wheel-drive motor vehicle and said output shaft is drivingly coupled to a propeller shaft of said motor vehicle.

* * * * *